United States Patent
Mukherjee

(10) Patent No.: US 9,369,719 B2
(45) Date of Patent: *Jun. 14, 2016

(54) ENTROPY CODING FOR RECOMPRESSION OF IMAGES

(71) Applicant: Google Inc., Mountain View, CA (US)

(72) Inventor: Debargha Mukherjee, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 14/539,943

(22) Filed: Nov. 12, 2014

(65) Prior Publication Data

US 2015/0071558 A1  Mar. 12, 2015

Related U.S. Application Data

(63) Continuation of application No. 13/604,494, filed on Sep. 5, 2012, now Pat. No. 8,891,888.

(51) Int. Cl.
*G06K 9/36* (2006.01)
*G06K 9/46* (2006.01)
*H04N 19/13* (2014.01)
*H04N 19/176* (2014.01)
*H04N 19/91* (2014.01)
*H04N 19/136* (2014.01)

(52) U.S. Cl.
CPC ............ *H04N 19/13* (2014.11); *H04N 19/136* (2014.11); *H04N 19/176* (2014.11); *H04N 19/91* (2014.11)

(58) Field of Classification Search
None
See application file for complete search history.

(56) References Cited

U.S. PATENT DOCUMENTS

| | | | |
|---|---|---|---|
| 6,055,272 A | 4/2000 | Kim | |
| 6,141,446 A | 10/2000 | Boliek et al. | |
| 7,170,939 B2 | 1/2007 | Uetani | |
| 7,620,252 B2 | 11/2009 | Mukherjee | |
| 7,843,998 B2 | 11/2010 | Bjontegaard | |
| 8,208,550 B2 | 6/2012 | Mukherjee et al. | |
| 8,891,888 B2 * | 11/2014 | Mukherjee | 382/233 |
| 2004/0228540 A1 | 11/2004 | Chen et al. | |
| 2005/0008238 A1 | 1/2005 | Chiu et al. | |
| 2006/0239576 A1 | 10/2006 | Mukherjee | |
| 2008/0013633 A1 | 1/2008 | Ye et al. | |
| 2008/0123947 A1 | 5/2008 | Moriya et al. | |
| 2008/0228476 A1 | 9/2008 | Mehrotra et al. | |
| 2009/0034619 A1 | 2/2009 | Mukherjee et al. | |
| 2009/0175334 A1 | 7/2009 | Ye et al. | |
| 2010/0150226 A1 | 6/2010 | Hallapuro et al. | |

(Continued)

OTHER PUBLICATIONS

Marpe, D. et al., "Context-based adaptive binary arithmetic coding in the H.264/AVC video compression standard," IEEE Transactions on Circuits and Systems for Video Technology, Jul. 2003, pp. 620-636, vol. 13, No. 7.

(Continued)

*Primary Examiner* — Feng Niu
(74) *Attorney, Agent, or Firm* — Fenwick & West LLP

(57) ABSTRACT

A code is received. The code conveys data about a quantized coefficient that corresponds to a pixel of an image file. A decoding mode and a version of a code mapping format for decoding the received code is determined. The decoding mode and the version of the code mapping format dynamically change based on a previously-decoded code. The received code is decoded, during the decoding mode, according to the version of the code mapping format to obtain the data about the quantized coefficient.

20 Claims, 11 Drawing Sheets

(56) References Cited

U.S. PATENT DOCUMENTS

| | | |
|---|---|---|
| 2010/0231688 A1 | 9/2010 | Park et al. |
| 2010/0309286 A1 | 12/2010 | Chen et al. |
| 2011/0052087 A1 | 3/2011 | Mukherjee |
| 2012/0020408 A1 | 1/2012 | Chen et al. |
| 2012/0069899 A1 | 3/2012 | Mehrotra et al. |
| 2012/0307888 A1 | 12/2012 | Guo et al. |
| 2013/0182757 A1* | 7/2013 | Karczewicz et al. .... 375/240.02 |

OTHER PUBLICATIONS

Mukherjee, D. et al., "Distributed Image Coding for Imformation Recovery From the Print-Scan Channel," 15th IEEE International Conference on Image Processing, Oct. 2008, pp. 2212-2215.

Office Action, U.S. Appl. No. 13/604,494, Apr. 18, 2014, twelve pages.

Wiegand, T. et al., "Overview of the H.264/AVC video coding standard," IEEE Transactions on Circuits and Systems for Video Technology, Jul. 2003, pp. 560-576, vol. 13, No. 7.

* cited by examiner

ENTROPY CODING FOR RECOMPRESSION OF IMAGES

TECHNICAL FIELD

This specification relates generally to systems and methods for encoding and decoding content, and more particularly to systems and methods for encoding and decoding data related to image pixels.

BACKGROUND

For transmission of a JPEG image file, the JPEG image file is organized according to 8×8 blocks of pixels and a discrete cosine transform (DCT) is performed on each 8×8 block. After the application of the DCT, the data for each pixel in a block undergoes quantization. After the DCT and quantization, each JPEG block comprises a set of quantized coefficients prior to transmission. The process of quantization affects the accuracy of each coefficient, thereby causing some loss with regard to the image's resolution and appearance. The JPEG format applies entropy encoding to encode each quantized coefficient for transmission of the JPEG image file to an image recipient.

Upon receipt of the entropy-encoded quantized coefficients, the image recipient reverses the entropy encoding in order to obtain the JPEG image file's quantized coefficients. The quantization and the DCT can be reversed as well to obtain image data for the recipient to sufficiently reconstruct and display the JPEG image file.

SUMMARY

In accordance with an embodiment, methods, systems, and apparatus for GPEG entropy encoding and GPEG entropy decoding are provided herein. GPEG entropy encoding and GPEP entropy decoding provide a more compact and efficient approach to encode and decode the JPEG quantized coefficients without incurring any further loss experienced by JPEG quantization. GPEG entropy encoding is an intermediate image file format that can be used in place of JPEG entropy encoding. Specifically, GPEG entropy encoding and GPEG entropy decoding involve a more efficient approach for representing the JPEG quantized coefficients.

In one embodiment, a code is received. The code conveys data about a quantized coefficient that corresponds to a pixel of an image file. A decoding mode and a version of a code mapping format for decoding the received code are determined. The decoding mode and the version of the code mapping format dynamically change based on a previously-decoded code. The received code is decoded, during the decoding mode, according to the version of the code mapping format to obtain the data about the quantized coefficient.

In another embodiment, the version of the code mapping format is generated as a terminated infinite tree code designed according to parameters based on a decoding context.

In one embodiment, consecutive blocks of zero coefficients are constructed and populated upon initiating a zero block run decoding mode.

In another embodiment, a block of coefficients is constructed as having at least one zero coefficient and at least one non-zero coefficient upon initiating a block decoding mode.

In one embodiment, due to the code compression provided by GPEG entropy encoding, a reduction in memory required to store large amounts of JPEG image files can be experienced by storing the JPEG image files as GPEG encoded image files. Upon request of a particular JPEG image file, the corresponding GPEG encoded image file can be decoded, via GPEG entropy decoding, to obtain the JPEG quantized coefficients.

These and other advantages of the present disclosure will be apparent to those of ordinary skill in the art by reference to the following Detailed Description and the accompanying drawings.

DETAILED DESCRIPTION

In accordance with an embodiment, a method, system and apparatus for GPEG entropy encoding and GPEG entropy decoding is provided herein. GPEG entropy encoding is an intermediate image file format that can be used in place of JPEG entropy encoding. Specifically, GPEG entropy encoding and GPEG entropy decoding involve a more efficient and compressed approach for representing JPEG quantized coefficients.

Figure 1:
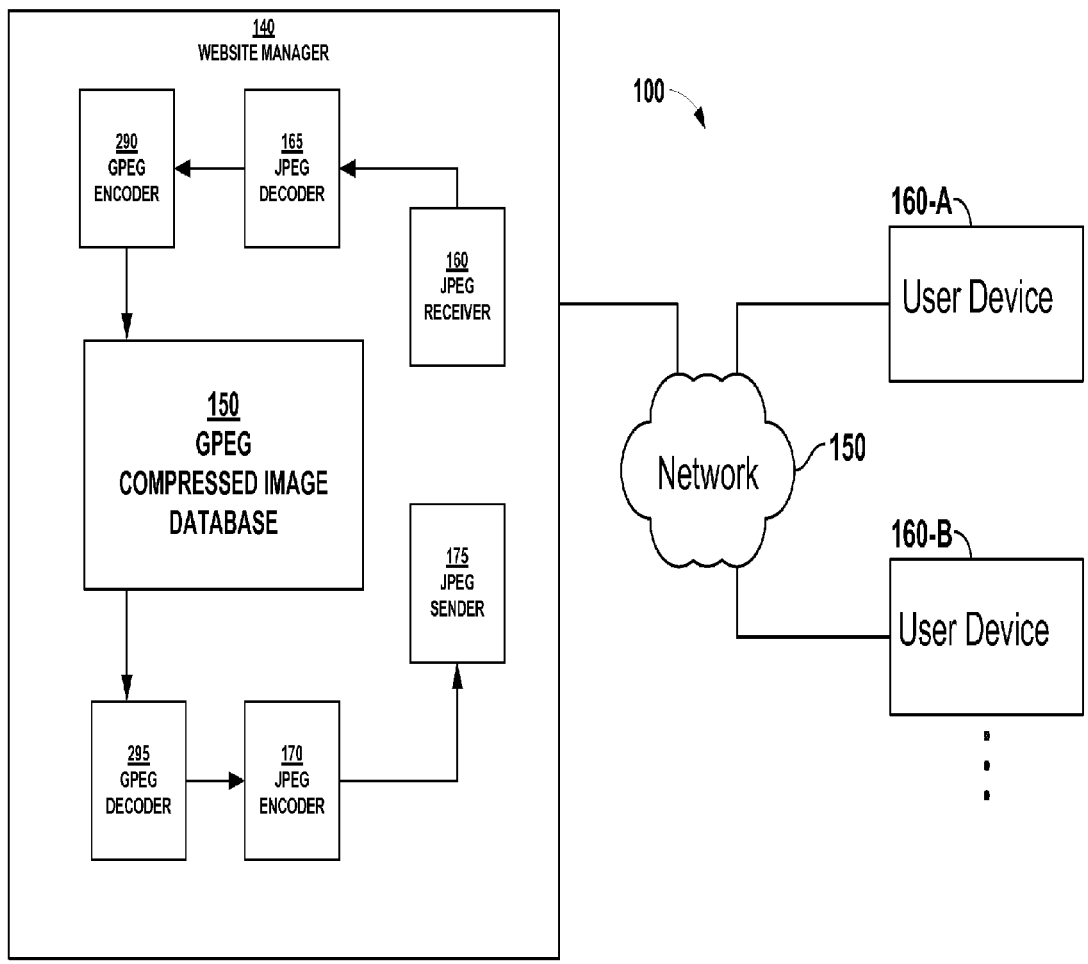
FIG. 1 shows a communication system implementing a GPEG encoder and GPEG decoder in accordance with embodiments described herein.

FIG. 1 shows a communication system implementing a GPEG encoder and GPEG decoder in accordance with embodiments described herein. Communication system 100 includes a website manager 140, a network 150 and several user devices 160-A, 160-B, etc. For convenience, the term "user device 160" is used herein to refer to any one of user devices 160-A, 160-B, etc. Accordingly, any discussion herein referring to "user device 160" may be equally applicable to each of user devices 160-A, 160-B, 160-C, etc. Communication system 100 may include more or fewer than three user devices.

In the exemplary embodiment of FIG. 1, network 150 is the Internet. In other embodiments, network 150 may include one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 105 may include a combination of different types of networks.

Website manager 140 can be part of a website, accessible via network 150, which comprises one or more web pages containing various types of information, such as articles, comments, images, photographs, etc.

Website manager 140 includes a JPEG receiver 160, a JPEG decoder 165, a GPEG encoder 290, a GPEG compressed image database 150, a GPEG decoder 295, a JPEG encoder 170 and a JPEG sender 175. The GPEG compressed image database 150 can store any number of GPEG encoded images.

The JPEG receiver 160 receives JPEG images sent from a user device 160 to be stored by the website manager 140 in the GPEG compressed image database 150. The JPEG decoder 165 decodes each received JPEG image in order to reverse the JPEG entropy encoding used for transmitting JPEG images. Decoding the JPEG entropy encoding of a received JPEG image results in obtaining blocks of quantized coefficients associated with pixels in the received JPEG image. The GPEG encoder 290 receives the blocks of quantized coefficients from the JPEG decoder 165 and encodes the blocks of quantized coefficients according to the GPEG format. The GPEG encoder 290 stores the encoded blocks of quantized coefficients in the GPEG compressed image database 150.

When a user device 160 requests a particular JPEG image from the website manager 140, the website manager 140 sends the encoded blocks of quantized coefficients that correspond to the requested JPEG image to the GPEG decoder 295. The GPEG decoder 295 reverses the GPEG encoding to obtain the blocks of quantized coefficients that correspond to the requested JPEG image. The JPEG encoder 170 receives the blocks of quantized coefficients from the GPEG decoder and applies JPEG entropy encoding. Once the JPEG entropy encoding is applied, the JPEG sender 175 can transmit the JPEG entropy encoded data to the user 160 device.

User device 160 may be any device that enables a user to communicate via network 105. User device 160 may be connected to network 150 through a direct (wired) link, or wirelessly. User device 160 may have a display screen (not shown) for displaying information. For example, user device 160 may be a personal computer, a laptop computer, a workstation, a mainframe computer, etc. Alternatively, user device 160 may be a mobile communication device such as a wireless phone, a personal digital assistant, etc. Other devices may be used.

Figure 2A:
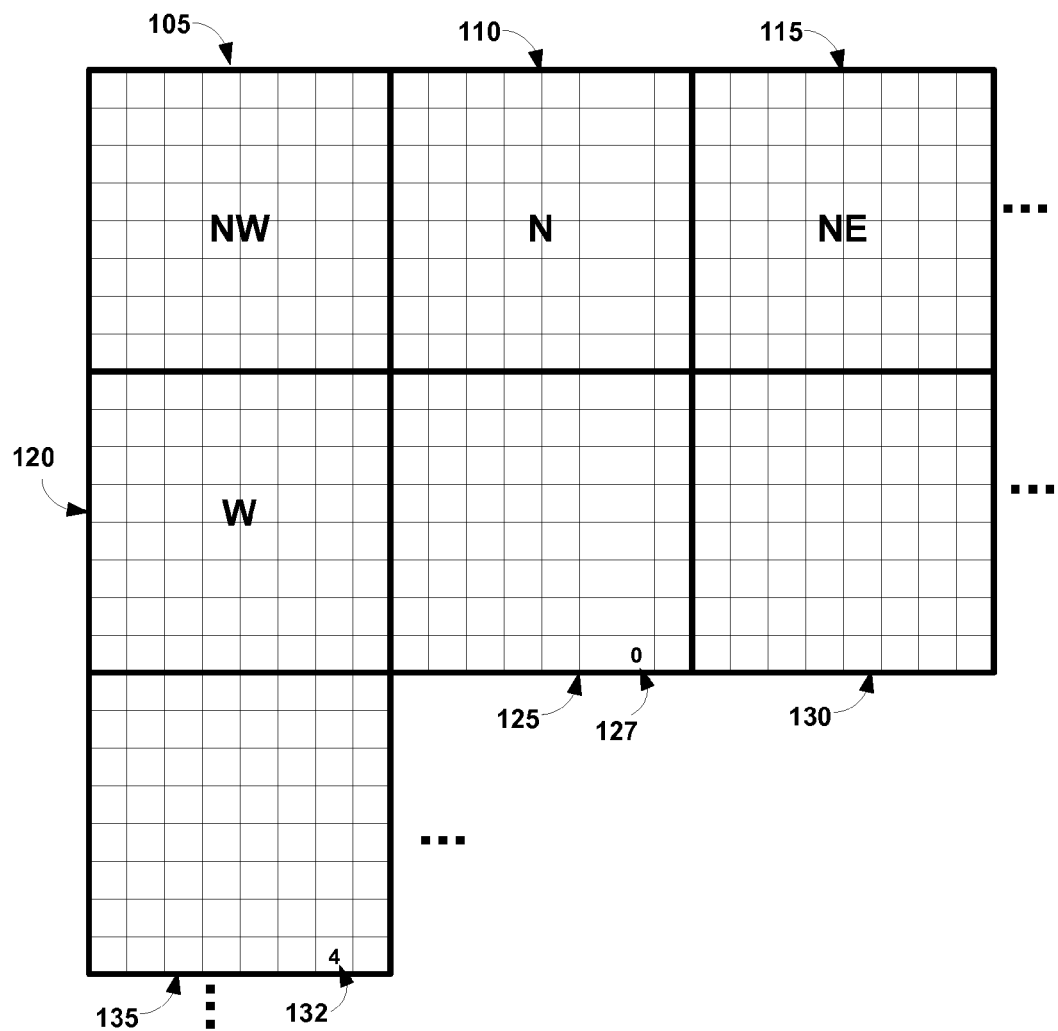
FIG. 2A shows multiple blocks of coefficients in accordance with embodiments described herein.

FIG. 2A shows multiple blocks of coefficients in accordance with embodiments described herein. Each block 105, 110, 115, 120, 125, 130, 135 includes multiple quantized coefficients (such as a zero coefficient 127 or a non-zero coefficient 132) of a corresponding image pixel's DCT. It is understood that various embodiments are not limited to a particular amount of blocks or coefficients. In addition, the term "block" is not intended to limit or characterize a conceptual shape of each block 105, 110, 115, 120, 125, 130, 135.

For purposes of simplicity, FIGS. 2B, 3, 5, 6, 7 illustrate codes encoded according to the GPEG format being transmitted from the encoder 290 to the decoder 295. However, it is understood that, in various embodiments, the GPEG compressed image database 150 first receives the codes from the encoder 290 and stores the codes. The stored codes are then later received by the decoder 290 to reverse the GPEG encoding.

Figure 2B:
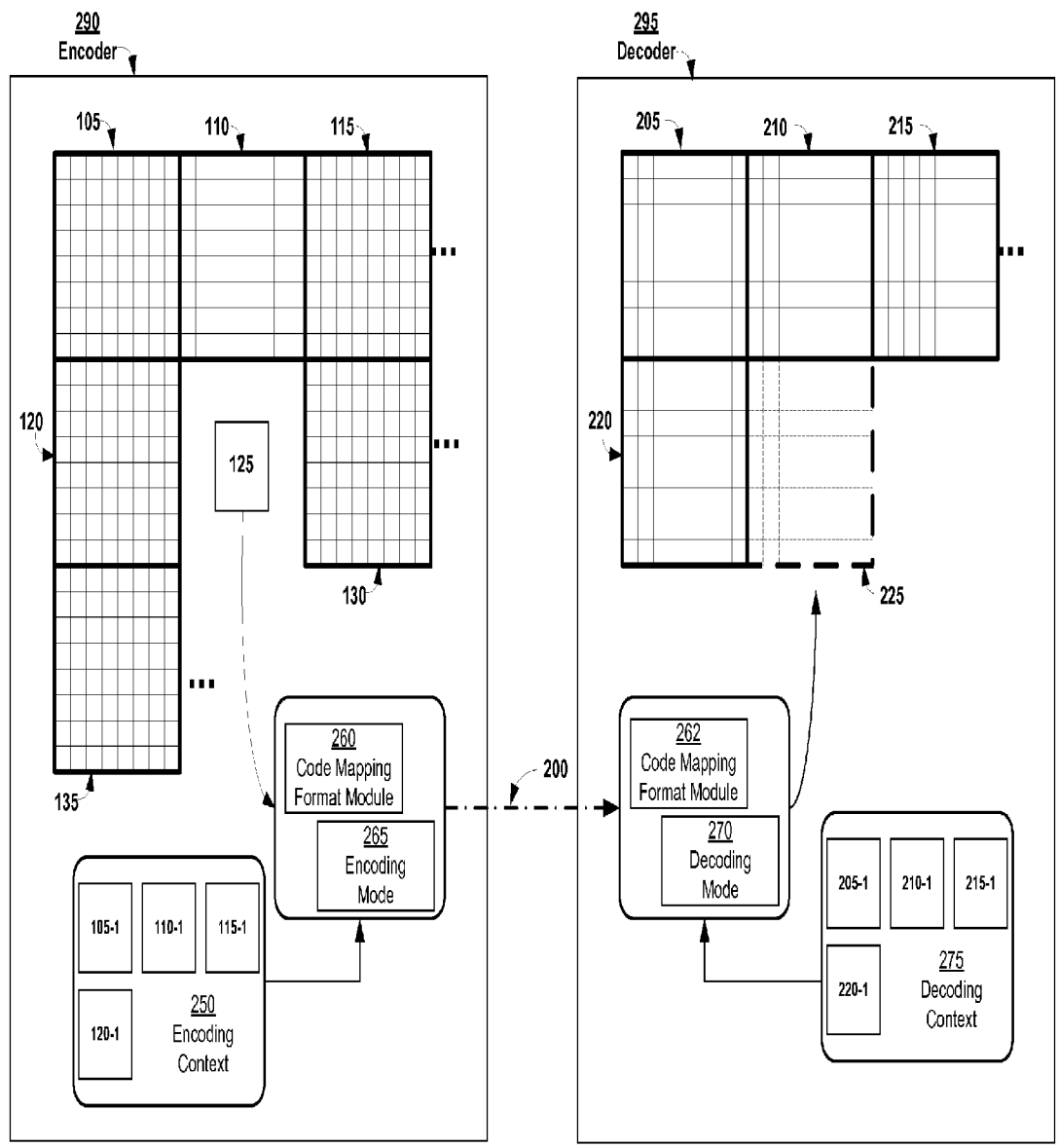
FIG. 2B shows a current block being encoded and decoded in accordance with embodiments described herein.

FIG. 2B shows a current block 125 being encoded and decoded in accordance with embodiments described herein. The GPEG encoder 290 (hereinafter "encoder 290") is currently encoding current block 125 and the GPEG decoder 295 (hereinafter "decoder 295") decodes the code 200 it receives to create a decoded version 225 of the current block. The encoder 290 has already encoded blocks 105, 110,115 120 near the current block 125 and the decoder 295 has already decoded corresponding blocks 205, 210, 215 and 220. That is, block 205 is the decoded version of block 105. Block 210 is the decoded version of block 110. Block 215 is the decoded version of block 115. Block 220 is the decoded version of block 120.

The encoder 290 uses an encoding context 250 to encode the current block 125. The encoding context 250 represents characteristics 105-1, 110-1, 115-1, 120-1 that are associated, respectively, with blocks 105, 110, 115, 120 near the current block 125. Therefore, the encoding context 250 is predictive of the current block's 125 characteristics.

Since the encoding context 250 is predictive of characteristics of the current block 125, parameters derived from the encoding context 250 assist in updating a current version of a code mapping format that produces bitcodes to efficiently represent the various coefficients in the current block 125. The parameters from the encoding context 250, for example, can be the number of coefficients in the current block 125, as well as a predicted range and distribution of the current block's 125 coefficients. The code mapping format module 260 applies the parameters to terminated infinite-trees in order to generate bitcodes that represent the values of the current block's 125 coefficients. A terminated infinite tree code updates the code mapping format so that the coefficient value that is predicted to occur most often in the current block 125 will have the smallest bitcode length. In addition, the bitcode length produced by the terminated infinite tree code will also be affected by the predicted range of coefficient values in the current block 125 and the number of coefficients in the current block 125. The code mapping format module 262 of the decoder 295 uses parameters from the decoding context 275 in a similar fashion.

As the encoder 290 moves from encoding the current block 125 to encoding a subsequent block 130, the encoder 290 updates the encoding context 250 based on characteristics of certain neighboring blocks near the subsequent block 130. For example, characteristics of the current block 125 can be included in the encoding context 250 for encoding of the subsequent block 130. Therefore, each block is encoded according to its own encoding context 250, which ensures a greater likelihood that changes to the code mapping format from block to block will generate the most efficient bit codes to best represent the coefficients in each block.

In the encoder 290, the code mapping format module 260 uses characteristics 105-1, 110-1, 115-1, 120-1 (such as DC coefficients and total number of non-zero coefficients) of each neighboring, previously-encoded block 105, 110, 115, 120 to determine parameters to be used by the code mapping format module 260.

In some embodiments, the encoding context 250 is based on stored DC coefficients (i.e. average grey scale values) of each previously-encoded block 105, 110, 115, 120 and a stored total number of non-zero coefficients for each previously-encoded block 105, 110, 115, 120. The encoding context 250 provides parameters regarding the number of coefficients to be encoded in the current block 125, a most common coefficient from the previously-encoded blocks 105, 110, 115, 120 and a shape of the distribution of the coefficients from the previously-encoded blocks 105, 110, 115, 120. These parameters are used to design a terminated infinite-tree code to generate a particular version of the code mapping format for encoding coefficients that are predicted to occur in the current block 125. As the encoding context 250 changes, the parameters will change, thereby effecting the design of the terminated infinite-tree code used to generate the code mapping format.

Encoder 290 transmits a code 200 to the decoder 295. When decoding a code 200 representing a coefficient in the current block 125, the decoder 295 utilizes characteristics 205-1, 210-1, 215-1, 220-1 (such as DC coefficients and a total number of non-zero coefficients) that are associated, respectively, with previously-decoded blocks 205, 201, 215, 220 to determine a compatible version of the code mapping format used by the encoder 290 to create the code 200. Since the decoder 295 has already decoded various blocks 205, 210, 215 220, the decoder 295 creates a decoding context 275 that is based on the same block characteristics 105-1, 110-1, 115-1, 120-1 used by the encoding context 250. The decoding context 275 thereby provides its code mapping format module 262 with the same (or similar) parameters as the encoding context 250. The decoder 295 obtains parameters from the decoding context 275 to effect the design of a terminated infinite-tree code in order to determine the compatible version of the code mapping format.

In addition, the encoder 290 and decoder 295 achieve greater levels of efficiency through the use of implicit encoding modes 265 and decoding modes 270, respectively. In other words, not only is code compression achieved through dynamically changing versions of the code mapping format used to encode and decode the coefficients in each block, but various coding modes signal to the encoder 290 and decoder 295 that certain codes are to represent different types (or amounts) of data at different times.

Figure 3:
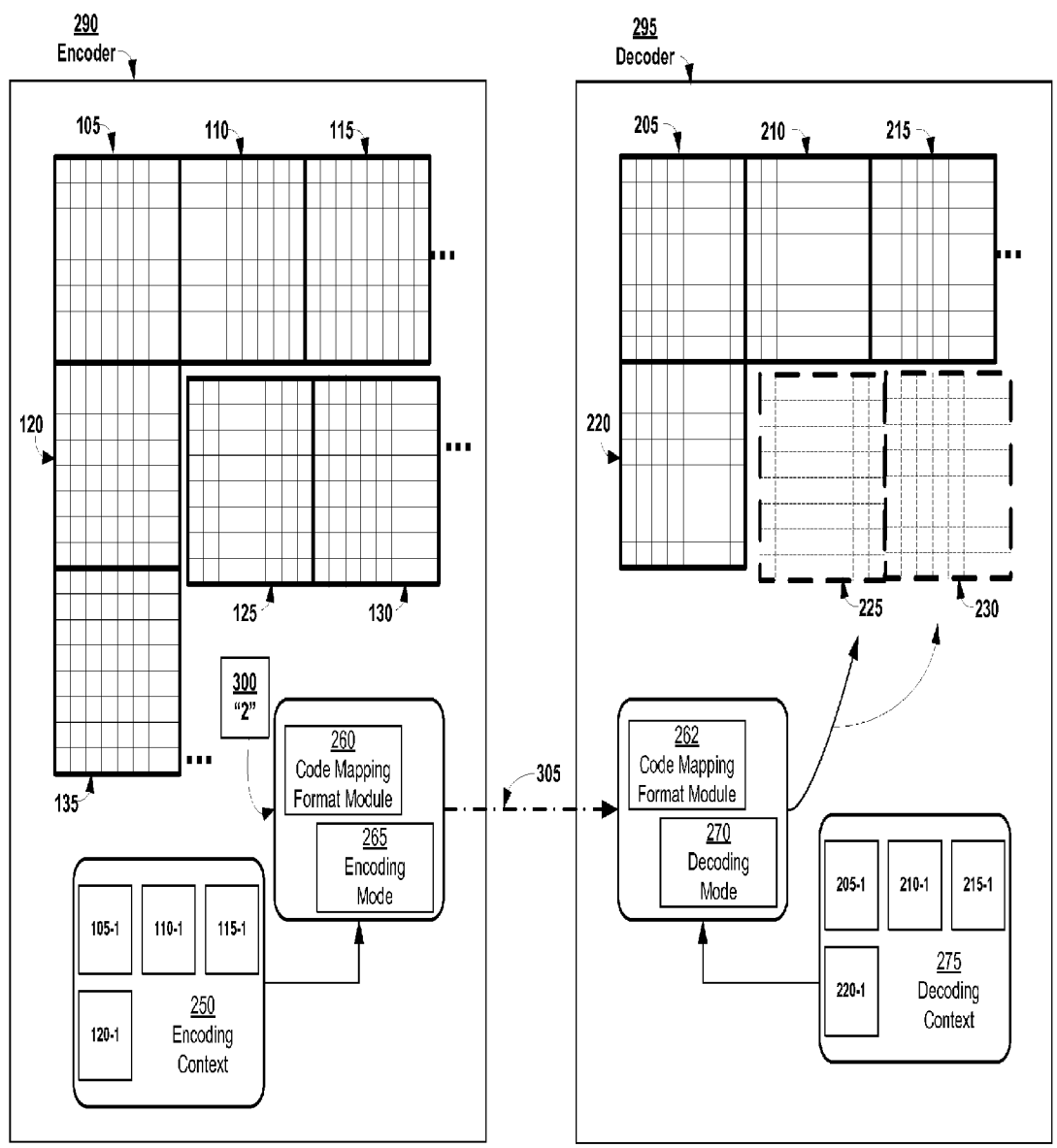
FIG. 3 shows multiple blocks being encoded and decoded during a zero block run encoding mode and a zero block run decoding mode, respectively, in accordance with embodiments described herein.

FIG. 3 shows multiple blocks being encoded and decoded during a zero block run encoding mode and a zero block run decoding mode, respectively, in accordance with embodiments described herein. The encoder 290 uses the encoding context 250 to determine when it is appropriate to switch to the zero block run encoding mode, such as when the block characteristics 105-1, 110-1, 115-1, 120-1 indicate only zero coefficients in the previously-encoded blocks 105, 110, 115, 120. The zero block run encoding mode generates a code 305 that represents a total number 300 (i.e. "2") of subsequent, consecutive blocks 125, 130 that are populated with only zero coefficients.

Likewise, the decoder 295, utilizes the block characteristics 205-1, 210-1, 215-1, 220-1 in the decoding context 275 to determine the encoder 290 is sending the code 305 during the zero block run encoding mode. When the decoder 295 receives the code 305, the decoder's 295 code mapping format module 262 determines the compatible version of the code mapping format to decode the code 305 based on parameters from the decoding context 275. In addition, the decoder 295 initiates a zero block run decoding mode to decode the code 305 as representing a total number 300 (i.e. "2") of consecutive blocks 125, 130 populated with only zero coefficients. Upon decoding the code 305, the decoder 295 constructs two blocks 225, 230 of coefficients as being populated with only zero coefficients. Therefore, both the zero block run encoding and decoding modes, with the use of the dynamically changing code mapping format, allow the code 305 to represent all the zero coefficients in multiple blocks 125, 130 with a minimal use of bits.

In addition, in one embodiment, when the zero block run encoding mode is complete and the encoder 290 begins encoding a new block, encoding logic in the encoder 290 assumes that the new block must have at least one non-zero coefficient—or else it would have already been encoded during the previous zero block run coding mode. In this case, the encoder 290 utilizes the logical assumption of a presence of at least one non-zero coefficient in the new block as a parameter from the encoding context 250 to change the code mapping format during encoding of the new block. The decoder 295 can use the same logical assumption to similarly change the code mapping format when decoding the code for the new block.

Figure 4:
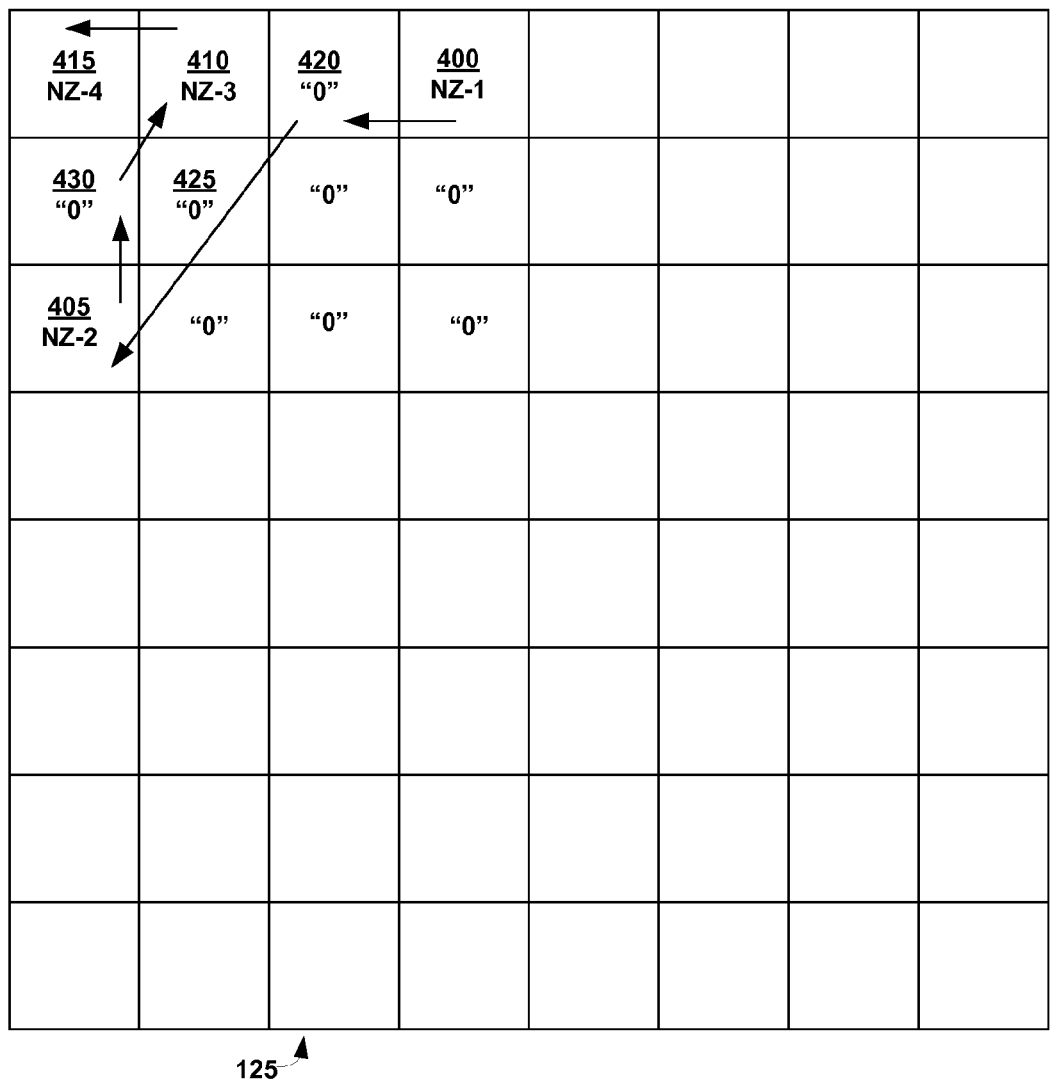
FIG. 4 shows zero coefficients and non-zero coefficients positioned within a current block in accordance with embodiments described herein.

FIG. 4 shows zero coefficients and non-zero coefficients positioned within a current block 125 in accordance with embodiments described herein. It is understood that the coefficients illustrated in FIG. 4 are placed in the current block 125 according to a reverse zig-zag scan order of: NZ-1 400, "0" 420, "0" 425, NZ-2 405, "0" 430, NZ-3 410 and NZ-4 415. The encoder 290 can predict how many non-zero coefficients 400, 405, 410, 415 are in the current block 125 based on the encoding context 250. As illustrated in FIG. 4, the current block 125 has a total of four (4) non-zero coefficients 400, 405, 410, 415 and three (3) zero coefficients 420, 425, 430 occur after the first occurrence of a non-zero coefficient 400 in reverse zig-zag scan order. It is understood that all other coefficients in the current block 125 are zero coefficients as well.

Figure 5:
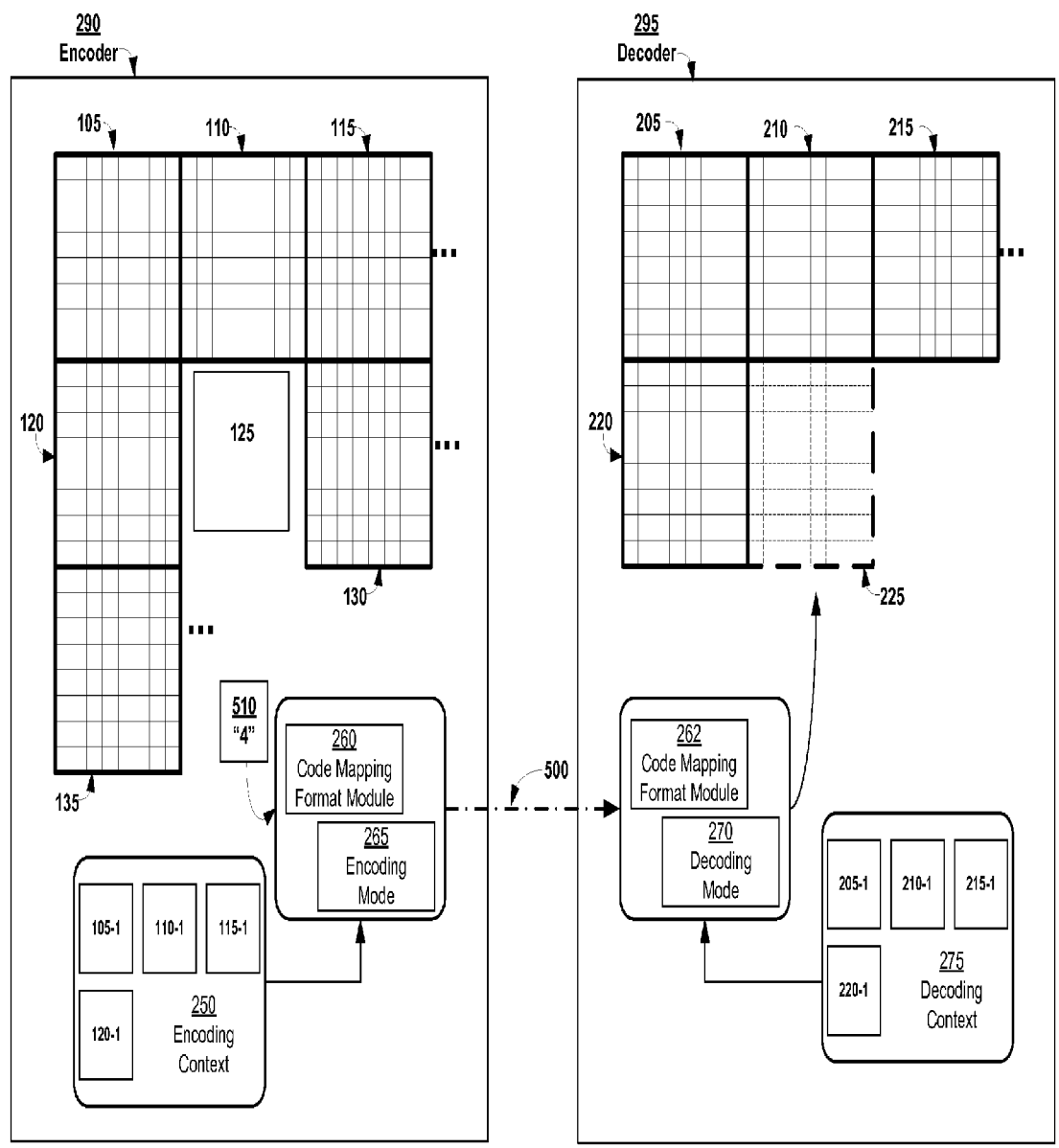
FIG. 5 shows a scenario for encoding and decoding a total number of non-zero coefficients in a current block during a block encoding mode and a block decoding mode, respectively, in accordance with embodiments described herein.

FIG. 5 shows a scenario for encoding and decoding a total number of non-zero coefficients in a current block 125 during a block encoding mode and a block decoding mode, respectively, in accordance with embodiments described herein.

Based on the encoding context 250, the encoder 290 detects a presence of at least one non-zero coefficient amongst the previously-encoded blocks 105, 110, 115, 120 near the current block 125 and initiates a block run encoding mode. A first code 500 generated by the encoder 290 during the block run encoding mode represents the total number of non-zero coefficients 510 in the current block 125. The encoder 290 updates the current version of the code mapping format and creates the first code 500 to represent the total number (i.e. "4") of non-zero coefficients 510 in the current block 125. The encoder 290 sends the first code 500 to the decoder 295.

Based on the decoding context 275, the decoder 295 initiates a block run decoding mode in which the first code 500 is implicitly understood as representing the total number of non-zero coefficients 510 in the current block 125. The decoder 295 receives the first code 500 and determines a compatible code mapping format, via the decoding context 275, for the first code 500 in order to decode the total number ("4") of non-zero coefficients 510 in the current block 125. By leveraging the updated code mapping format and the block run encoding mode, the encoder 295 has communicated to the decoder 290 how many non-zero coefficients are present in the current block 125 via an efficient use of bits.

Figure 6:
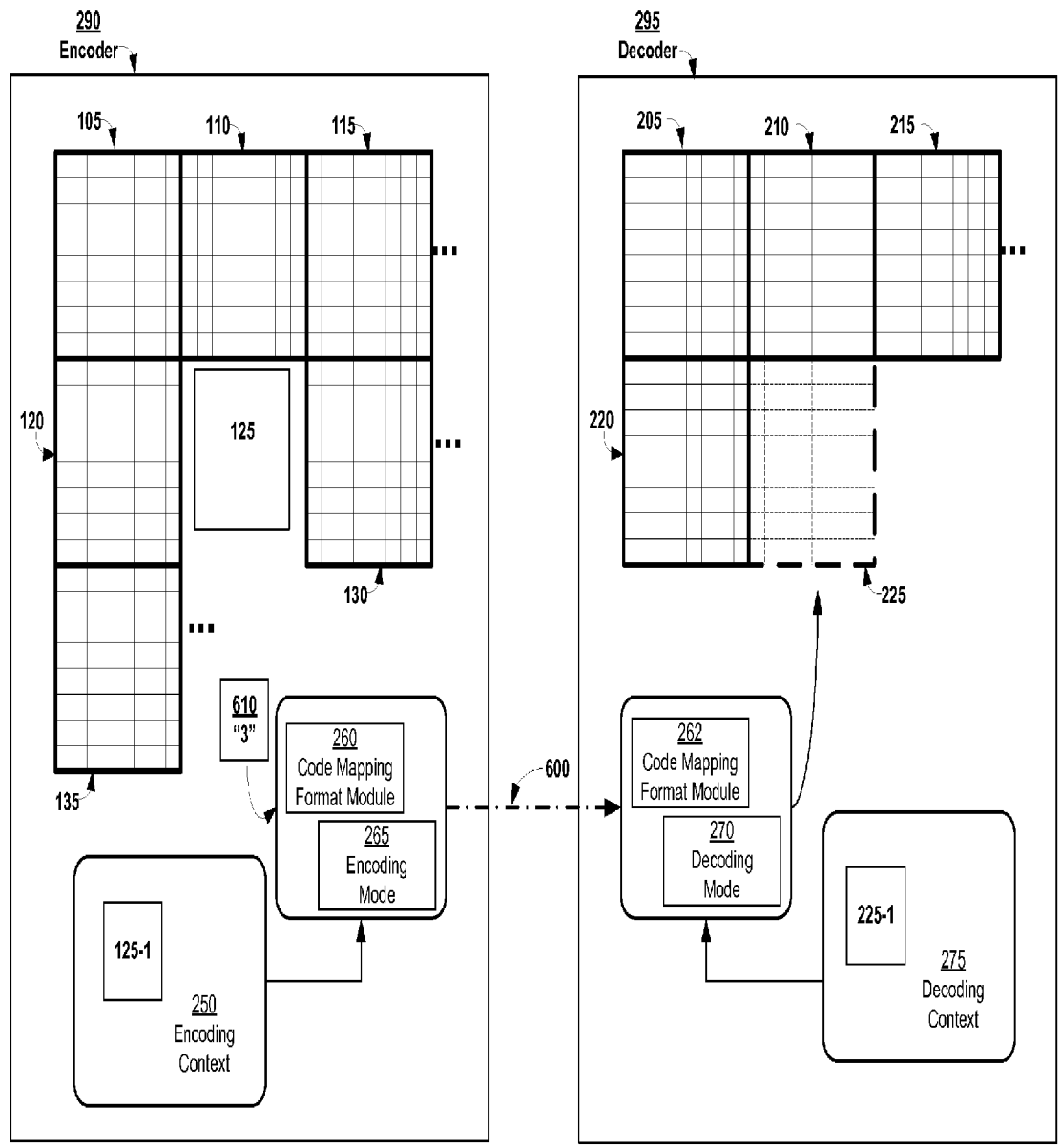
FIG. 6 shows a scenario for encoding and decoding a number of zero coefficients in a current block during a block encoding mode and a block decoding mode, respectively, in accordance with embodiments described herein.

FIG. 6 shows a scenario for encoding and decoding a number of zero coefficients in a current block 125 during a block encoding mode and a block decoding mode, respectively, in accordance with embodiments described herein. Specifically, a second code 600 in the block run encoding mode represents a number of zero coefficients that occur after a particular instance of a non-zero coefficient.

For example, the encoder 290 detects a presence of three zero coefficients 420, 425, 430 amongst the four non-zero coefficients 400, 405, 410, 415 (as illustrated in FIG. 4). The second code 600 in the block run encoding mode represents these three zero coefficients 420, 425, 430. The encoder 290 creates the second code 600 to represent the number 610 (i.e. "3") of the detected of zero coefficients 420, 425, 430 according to a code mapping format changed by parameters from the encoding context 250. However, in this case, the encoding context 250 is based on characteristics 125-1 of the current block 125 that have already been encoded—as opposed to characteristics of previously-encoded neighboring blocks. The encoder 290 sends the second code 600 to the decoder 295.

The decoder 295 receives the second code 600 during the decoding block decoding mode and determines a compatible code mapping format for the second code 600 in order to decode the number (i.e. "3") of zero coefficients 420, 425, 430. The compatible code mapping format is based on parameters from a decoding context 275 using characteristics 225-1 of the current decoded block 225 that have already been decoded.

At this point, the decoder 295 has received two types of codes 500, 600—each encoded in a distinct and efficient code mapping format during the block encoding mode—that, together, convey to the decoder 295 the presence of seven coefficients 400, 405, 410, 415, 420, 425, 430 in the current block 125.

Figure 7:
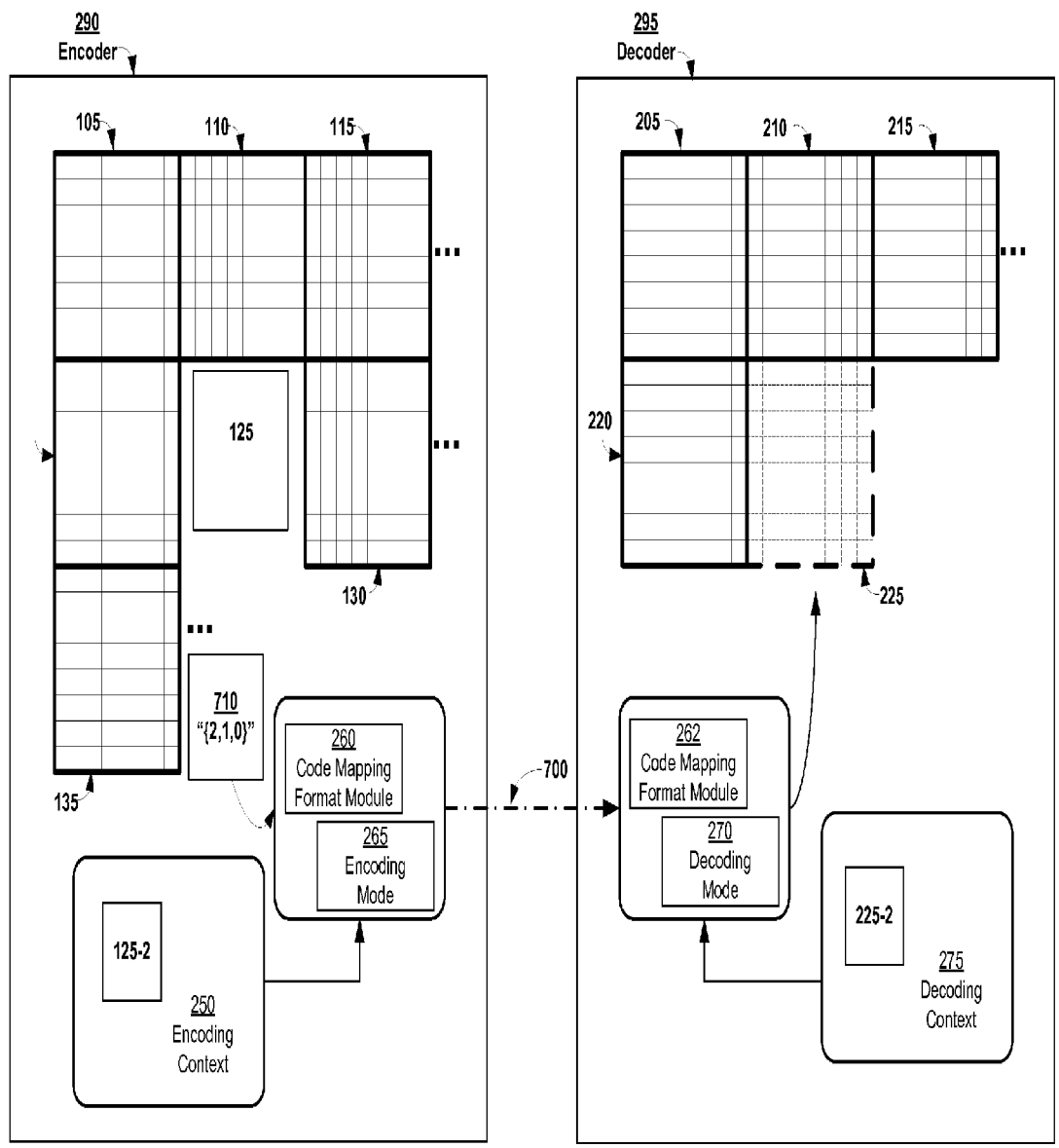
FIG. 7 shows a scenario for encoding and decoding a zero-run array during a block encoding mode and a block decoding mode, respectively, in accordance with embodiments described herein.

FIG. 7 shows a scenario for encoding and decoding a zero-run array 710 during a block encoding mode and a block decoding mode, respectively, in accordance with embodiments described herein. Specifically, a third code 700 in the block run encoding mode conveys a placement of the respective occurrences of the non-zero coefficients 405, 410, 415 and the zero coefficients 420, 425, 430 in the current block 125.

For example, the encoder 290 conveys a placement, in reverse zig-zag scan order, of the three non-zero coefficients 405, 410, 415 after an occurrence of the first non-zero coefficient 400. To do so, the encoder 290 encodes the zero run array 710. In one embodiment, the elements of the zero run array 710 describe how many zero coefficients are present in between each of the remaining non-zero coefficients 405, 410, 415 after the first non-zero coefficient 400. The number of array elements (i.e. the array's length) corresponds to the total number of remaining non-zero coefficients 405, 410, 415, which was previously conveyed by the second code 600. To generate the code mapping format for the zero run array 710, the encoding context 250 is based on characteristics 125-2 of the current block 125 that have already been encoded.

To encode the zero run array 710, the encoder 290 detects that the remaining non-zero coefficients 405, 410, 415 present in the current block 125 after the first occurrence of the non-zero coefficient 400 fail to outnumber the zero coefficients 420, 425, 430. The zero run array 710 can be described as "{2, 1, 0}." The first array element "2" of the zero run array 710 indicates that two zero coefficients 420, 425 occur between the first non-zero coefficient 400 and second non-zero-coefficient 405 in reverse zig-zag scan order. The second array element "1" indicates one zero coefficient 430 occurs between the second non-zero coefficient 405 and the third non-zero coefficient 410 in reverse zig-zag scan order. The third array element "0" indicates that no zero coefficient occurs between the third non-zero coefficient 410 and the last non-zero coefficient 415 in reverse zig-zag scan order.

Once the zero run array 710 is encoded, the encoder 290 sends the code 700 to the decoder 295. The decoder 295 receives the code 700 during the block decoding mode and, likewise, generates the code mapping format for the code 700 based on characteristics 225-2 of the current decoded block 225 that have already been decoded. The decoder 295 then decodes the code 700 to construct the current block 125 as populated with the non-zero coefficients 400-415 and the zero coefficients 420-430 according to their respective placements, in reverse zig-zag scan order, conveyed by the elements of the zero run array 710.

In some embodiments, the encoder 290 skips encoding the third array element "0" of the zero run array 710 because the first two array elements "2" and "1" when added together are equal to the total number of remaining non-zero coefficients (i.e."3")—as represented by code 600. Even though it is left encoded, the decoder 295 will implicitly know the third array element should be "0" because it previously received and decoded the code 600 for the total number ("3") of zero coefficients, so the decoder 295 would not expect the third array element to be anything other than "0" upon decoding the first two array elements, "2" and "1."

In another embodiment, if any zero run array has consecutive array elements with a value of "0," the encoder 290 encodes the number of consecutive zero array elements rather than each individual array element. For example, if a zero run array has three consecutive array elements with a value of "0," the encoder 290 will generate a code for the value "3," rather than encode three consecutive zeros. The encoder 290 will switch to this type of zero run array encoding mode when the remaining non-zero coefficients after the first occurrence of the non-zero coefficient 400 (in reverse zig-zag scan order) substantially outnumber the zero coefficients. Upon receiving the code for "3" from the encoder 290, the decoder 295 will similarly recognize that the remaining non-zero coefficients substantially outnumber the zero coefficients from information about the current block 225 it has recently decoded (i.e. codes 500, 600). The decoder 295 will thereby implicitly know that the received code for "3" describes three consecutive array elements that have a value of "0." The decoder 295 decodes the zero run array as having three consecutive array elements having a value of "0," as opposed to decoding a single array element as having a value of "3."

After encoding and decoding a zero run array, in some embodiments, the encoder 290 detects that some of the non-zero coefficients, in reverse zig-zag scan order, may each fall within a particular range of values. The encoder 290 encodes a total number of these non-zero coefficients, with an encoding context 250 based on the total number of non-zero coefficients in the current block 125 and the predetermined range of values. The following codes sent by the encoder 290 represent the actual values of each of these non-zero coefficients that fall within the predetermined range as well as their sign (i.e. positive, negative).

Code compression is achieved by using the total number of non-zero coefficients in the current block 125, the predetermined range of values and the total number of the non-zero coefficients that fall within the predetermined range as parameters to update the code mapping format. The code mapping format therefore only needs to use a minimum number of bits to represent a few non-zero coefficients within the predetermined range of values. In other words, since the encoder 290 is only encoding a few non-zero coefficients within a range of values, the possible permutations of bit-codes from a terminated infinite-tree is minimized.

The decoder 295 receives the codes and determines the compatible code mapping format to decode the codes because it also has access to the total number of non-zero coefficients in the current block 125, the predetermined range of values and the total number of the non-zero coefficients that fall within the predetermined range.

Figure 8:
FIG. 8 shows a scenario for encoding and decoding a value of a non-zero coefficient, in a current block, during a block encoding mode and a block decoding mode, respectively, in accordance with embodiments described herein.

FIG. 8 shows a scenario for encoding and decoding a value a non-zero coefficient 410, in a current block 125, during a block encoding mode and a block decoding mode, respectively, in accordance with embodiments described herein.

Some remaining non-zero coefficients may not fall within the predetermined range and have yet to be encoded by the encoder 290. The encoder 290 encodes the actual value for each remaining non-zero coefficient based on an encoding context that uses characteristics of surrounding coefficients.

For example, as illustrated in the FIG. 8, the encoder 290 encodes the third non-zero coefficient 410 in reverse zig-zag scan order with a code mapping format that uses parameters from an encoding context based on surrounding coefficients 400, 420, 425, 810, 820, 830, 840, 850. When the decoder 295 receives the corresponding code, it determines a compatible code mapping format because the decoder 295 will have already decoded the surrounding coefficients. The decoder 295 decodes the code for the third non-zero coefficient 410 with the compatible code mapping format.

In addition to various coding modes and dynamically changing the code mapping format by changing an encoding context (or decoding context) that provides parameters for a terminated infinite-tree code, the encoder 290 performs DC prediction for each block. A certain coefficient (i.e. a DC coefficient) in each block represents the DC value (i.e. the average gray scale value) for that block. The encoder 290 creates a code that conveys the value of the DC coefficient without incurring the processing costs of actually encoding the DC coefficient's value. The encoder 290 predicts the current block's 125 DC coefficient value based on the various DC coefficients of the previously-encoded neighboring blocks NW 105, N 110, NE 115, W 120.

Referring again to FIG. 2A, block 105 is labeled as "NW," block 110 is labeled as "N," block 115 is labeled as "NE," and block 120 is labeled as "W." In one embodiment, the predicted DC coefficient (hereinafter "pred(DC)") of the current block 125 can be based on the median of (N', W, N'+W−NW), where N' is a linear combination of N+NE. The encoder 290 generates a code that represents the difference between pred(DC) and the actual value of the current block's 125 DC coefficient (i.e. difference=actual DC value−pred(DC)).

The decoder 295 receives code representing the difference (i.e. difference=actual DC value−pred(DC)) and decodes it with the same code mapping format in which it was encoded. Since the decoder 295 previously decoded the neighboring blocks, the decoder 295 can independently determine pred (DC) as well. Once the decoder 295 decodes the code and determines pred(DC), the decoder 295 has enough data to determine the actual value of the DC coefficient for the current block 125 by merely adding the decoded value of the code and pred(DC) together.

Figure 9:
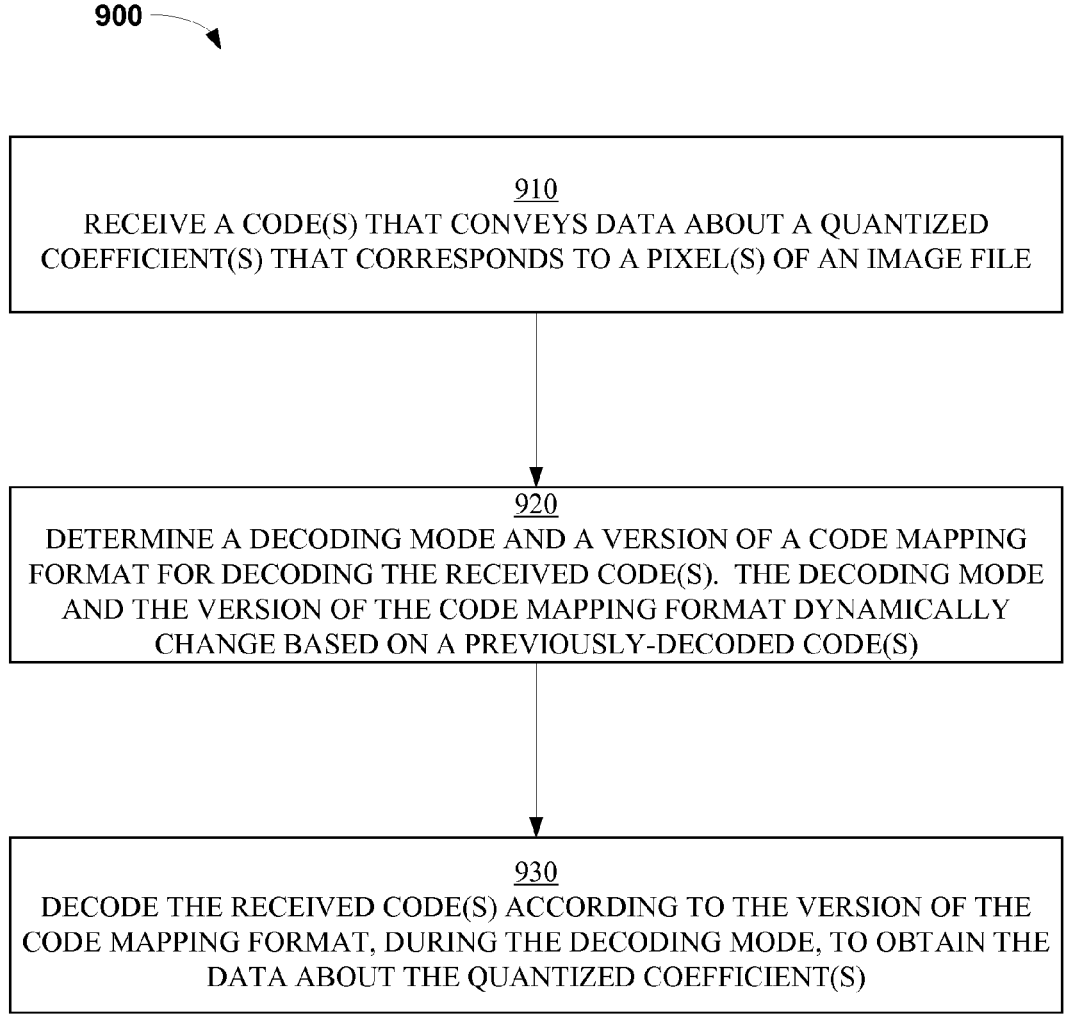
FIG. 9 is a flowchart of a method of decoding a code in accordance with embodiments described herein.

FIG. 9 is a flowchart 900 of a method of decoding a code in accordance with embodiments described herein.

At step 910, a code that conveys data about a quantized coefficient that corresponds to a pixel of an image file is received. As illustrated herein in FIGS. 2B, 3, 5, 6, 7, the decoder 295 receives codes encoded according to the GPEG format.

At step 920, a decoding mode and a version of a code mapping format is determined for decoding the received code. The decoding mode and the version of the code mapping format dynamically change based on a previously-decoded code. Specifically, the decoder 295 uses the decoding context 275, which is based on characteristics of previously-decoded blocks of quantized coefficients, in order to determine a decoding mode and code mapping format to decode a received code.

At step 930, the received code is decoded, by the decoder 295, according to the version of the code mapping format during the decoding mode to obtain the data about the quantized coefficient.

In various embodiments, the method steps described herein, including the method steps described in FIG. 9, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer. The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 9. Certain steps of the methods described herein, including one or more of the steps of FIG. 9, may be performed by a server or by another processor in a network-based cloud-computing system. Certain steps of the methods described herein, including one or more of the steps of FIG. 9, may be performed by a client computer in a network-based cloud computing system. The steps of the methods described herein, including one or more of the steps of FIG. 9, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 9, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 10:
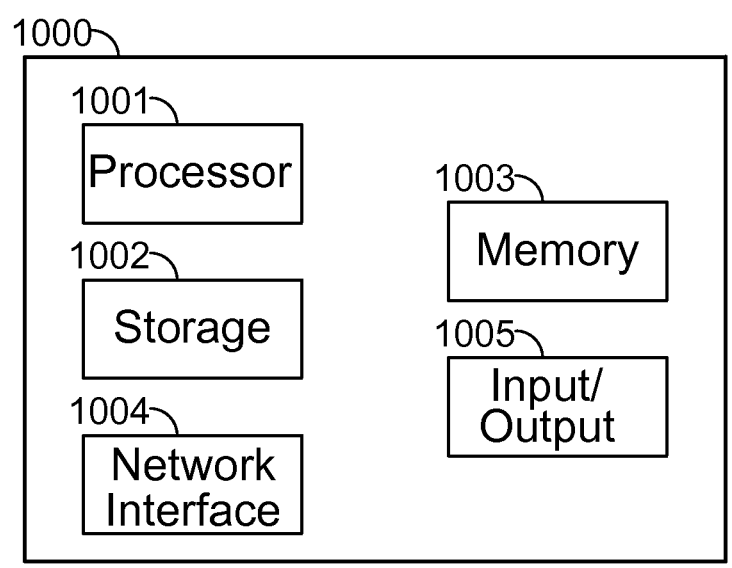
FIG. 10 shows components of a computer that may be used to implement certain embodiments described herein.

A high-level block diagram of an exemplary computer that may be used to implement systems, apparatus and methods described herein is illustrated in FIG. 10. Computer 1000 comprises a processor 1001 operatively coupled to a data storage device 1002 and a memory 1003. Processor 1001 controls the overall operation of computer 1000 by executing computer program instructions that define such operations. The computer program instructions may be stored in data storage device 1002, or other computer readable medium, and loaded into memory 1003 when execution of the computer program instructions is desired. Thus, the method steps of FIG. 9 can be defined by the computer program instructions stored in memory 1003 and/or data storage device 1002 and controlled by the processor 1001 executing the computer program instructions. For example, the computer program instructions can be implemented as computer executable code programmed by one skilled in the art to perform an algorithm defined by the method steps of FIG. 9. Accordingly, by executing the computer program instructions, the processor 1001 executes an algorithm defined by the method steps of FIG. 9. Computer 1000 also includes one or more network interfaces 1004 for communicating with other devices via a network. Computer 1000 also includes one or more input/output devices 1005 that enable user interaction with computer 1000 (e.g., display, keyboard, mouse, speakers, buttons, etc.).

Processor 1001 may include both general and special purpose microprocessors, and may be the sole processor or one of multiple processors of computer 1000. Processor 1001 may comprise one or more central processing units (CPUs), for example. Processor 1001, data storage device 1002, and/or memory 1003 may include, be supplemented by, or incorporated in, one or more application-specific integrated circuits (ASICs) and/or one or more field programmable gate arrays (FPGAs).

Data storage device 1002 and memory 1003 each comprise a tangible non-transitory computer readable storage medium. Data storage device 1002, and memory 1003, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1005 may include peripherals, such as a printer, scanner, display screen, etc. For example, input/output devices 1005 may include a display device such as a cathode ray tube (CRT) or liquid crystal display (LCD) monitor for displaying information to the user, a keyboard, and a pointing device such as a mouse or a trackball by which the user can provide input to computer 1200.

Any or all of the systems and apparatus discussed herein, including encoder 290, decoder 290, and components thereof, including encoding context 250, decoding context 270 and code mapping format modules 260, 262 may be implemented using a computer such as computer 1000.

One skilled in the art will recognize that an implementation of an actual computer or computer system may have other structures and may contain other components as well, and that FIG. 10 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
receiving at least one code that conveys data about at least one quantized coefficient corresponding to at least one pixel of an image file;
determining a decoding mode and a version of a code mapping format for decoding the at least one code, wherein the decoding mode and the version of the code mapping format dynamically change based on at least one previously-decoded code and wherein determining the decoding mode comprises:
upon determining at least one previously-decoded block of coefficients comprises at least one non-zero coefficient, initiating a block decoding mode; and
constructing a block of coefficients populated by at least one non-zero coefficient and at least one zero coefficient according to a plurality of codes decoded, according to a respective version of the code mapping format, during the block decoding mode; and
decoding the at least one code according to the version of the code mapping format, during the decoding mode, to obtain the data about the at least one quantized coefficient.

2. The method of claim 1, wherein determining the decoding mode based on at least one previously-decoded code further comprises:
upon determining at least one previously-decoded block of coefficients comprises only zero coefficients, initiating a zero block run decoding mode in which at least one received code represents a number of consecutive blocks of coefficients comprising only zero coefficients;
constructing each of the consecutive blocks of coefficients; and
populating each of the consecutive blocks of coefficients with zero coefficients.

3. The method of claim 2, wherein determining the version of the code mapping format comprises:
determining a decoding context based on characteristics of a plurality of previously-decoded blocks of coefficients;
obtaining parameters for a total number of coefficients per block, a distribution of coefficients and a most common coefficient based on the decoding context; and
generating the version of the code mapping format as a terminated infinite-tree code designed according to the parameters.

4. The method of claim 1, wherein constructing the block of coefficients comprises:

decoding a first received code as representing a total number of non-zero coefficients in the block of coefficients;
decoding a second received code as representing a total number of zero coefficients occurring amongst the non-zero coefficients in the block of coefficients; and
decoding a third received code as representing a placement, in reverse zig-zag scan order, of the non-zero coefficients and the zero coefficients in the block of coefficients.

5. The method of claim 4, wherein determining the version of the code mapping format comprises:
for decoding the first received code, determining a decoding context based on characteristics of a plurality of previously-decoded blocks of coefficients;
for decoding the second received code and the third received code, determining a decoding context based on characteristics of previously-decoded coefficients in the block of coefficients;
obtaining parameters for a total number of coefficients per block, a distribution of coefficients and a most common coefficient based on the decoding context; and
generating the version of the code mapping format as a terminated infinite-tree code designed according to the parameters.

6. The method of claim 4, further comprising:
decoding a fourth received code as representing a number of sequential occurrences of non-zero coefficients having a magnitude within a particular range of values; and
decoding at least one value code, received after the fourth code, as representing a magnitude and a sign of a respective non-zero coefficient having the magnitude within the particular range of values.

7. The method of claim 6, wherein determining the version of the code mapping format comprises:
for decoding the fourth code and each respective value code, determining a decoding context based on characteristics of previously-decoded coefficients in the block of coefficients;
obtaining parameters for a number of coefficients, a distribution of coefficients and a most common coefficient based on the total number of non-zero coefficients in the block of coefficients and the decoding context; and
generating the version of the code mapping format as a terminated infinite-tree code designed according to the parameters.

8. The method of claim 6, further comprising:
decoding at least one remaining non-zero coefficient code, received after a final value code, as representing a non-zero coefficient having a magnitude outside the particular range of values.

9. The method of claim 8, wherein determining the version of the code mapping format comprises:
for decoding each remaining non-zero coefficient code, determining a decoding context based on characteristics of a plurality of previously-decoded pixels surrounding a non-zero coefficient that corresponds to a respective remaining non-zero coefficient code;
obtaining parameters for a number of coefficients, a distribution of coefficients and a most common coefficient based on the decoding context; and
generating the version of the code mapping format as a terminated infinite-tree code designed according to the parameters.

10. A non-transitory computer readable medium having program instructions stored thereon, that in response to execution by a computing device cause the computing device to perform operations comprising:
receiving at least one code that conveys data about at least one quantized coefficient corresponding to at least one pixel of an image file;
determining a decoding mode and a version of a code mapping format for decoding the at least one code, wherein the decoding mode and the version of the code mapping format dynamically change based on at least one previously-decoded code and wherein determining the decoding mode comprises:
upon determining at least one previously-decoded block of coefficients comprises at least one non-zero coefficient, initiating a block decoding mode; and
constructing a block of coefficients populated by at least one non-zero coefficient and at least one zero coefficient according to a plurality of codes decoded, according to a respective version of the code mapping format, during the block decoding mode; and
decoding the at least one code according to the version of the code mapping format, during the decoding mode, to obtain the data about the at least one quantized coefficient.

11. The non-transitory computer readable medium of claim 10, wherein determining the decoding mode based on at least one previously-decoded code further comprises:
upon determining at least one previously-decoded block of coefficients comprises only zero coefficients, initiating a zero block run decoding mode in which at least one received code represents a number of consecutive blocks of coefficients comprising only zero coefficients;
constructing each of the consecutive blocks of coefficients; and
populating each of the consecutive blocks of coefficients with zero coefficients.

12. The non-transitory computer readable medium of claim 11, wherein determining the version of the code mapping format comprises:
determining a decoding context based on characteristics of a plurality of previously-decoded blocks of coefficients;
obtaining parameters for a total number of coefficients per block, a distribution of coefficients and a most common coefficient based on the decoding context; and
generating the version of the code mapping format as a terminated infinite-tree code designed according to the parameters.

13. The non-transitory computer readable medium of claim 10, wherein constructing the block of coefficients comprises:
decoding a first received code as representing a total number of non-zero coefficients in the block of coefficients;
decoding a second received code as representing a total number of zero coefficients occurring amongst the non-zero coefficients in the block of coefficients; and
decoding a third received code as representing a placement, in reverse zig-zag scan order, of the non-zero coefficients and the zero coefficients in the block of coefficients.

14. The non-transitory computer readable medium of claim 13, wherein determining the version of the code mapping format comprises:
for decoding the first received code, determining a decoding context based on characteristics of a plurality of previously-decoded blocks of coefficients;
for decoding the second received code and the third received code, determining a decoding context based on characteristics of previously-decoded coefficients in the block of coefficients;

obtaining parameters for a total number of coefficients per block, a distribution of coefficients and a most common coefficient based on the decoding context; and generating the version of the code mapping format as a terminated infinite-tree code designed according to the parameters.

15. The non-transitory computer readable medium of claim 13, further comprising:

decoding a fourth received code as representing a number of sequential occurrences of non-zero coefficients having a magnitude within a particular range of values; and decoding at least one value code, received after the fourth code, as representing a magnitude and a sign of a respective non-zero coefficient having the magnitude within the particular range of values.

16. The non-transitory computer readable medium of claim 15, wherein determining the version of the code mapping format comprises:

for decoding the fourth code and each respective value code, determining a decoding context based on characteristics of previously-decoded coefficients in the block of coefficients;

obtaining parameters for a number of coefficients, a distribution of coefficients and a most common coefficient based on the total number of non-zero coefficients in the block of coefficients and the decoding context; and generating the version of the code mapping format as a terminated infinite-tree code designed according to the parameters.

17. The non-transitory computer readable medium of claim 15, further comprising:

decoding at least one remaining non-zero coefficient code, received after a final value code, as representing a non-zero coefficient having a magnitude outside the particular range of values;

wherein determining the version of the code mapping format comprises:

for decoding each remaining non-zero coefficient code, determining a decoding context based on characteristics of a plurality of previously-decoded pixels surrounding a non-zero coefficient that corresponds to a respective remaining non-zero coefficient code;

obtaining parameters for a number of coefficients, a distribution of coefficients and a most common coefficient based on the decoding context; and generating the version of the code mapping format as a terminated infinite-tree code designed according to the parameters.

18. An apparatus, comprising:

a processor for executing computer program code; and a non-transitory memory storing computer program code executable to perform steps comprising:

receiving at least one code that conveys data about at least one quantized coefficient corresponding to at least one pixel of an image file;

determining a decoding mode for decoding the at least one code, determining a decoding mode comprising:

upon determining at least one previously-decoded block of coefficients comprises at least one non-zero coefficient, initiating a block decoding mode; and constructing a block of coefficients populated by at least one non-zero coefficient and at least one zero coefficient according to a plurality of codes decoded, according to a respective version of the code mapping format, during the block decoding mode;

determining a version of a code mapping format for decoding the at least one code, wherein the decoding mode and the version of the code mapping format dynamically change based on at least one previously-decoded code; and decoding the at least one code according to the version of the code mapping format, during the decoding mode, to obtain the data about the at least one quantized coefficient.

19. The apparatus of claim 18, wherein constructing the block of coefficients comprises:

decoding a first received code as representing a total number of non-zero coefficients in the block of coefficients;

decoding a second received code as representing a total number of zero coefficients occurring amongst the non-zero coefficients in the block of coefficients; and decoding a third received code as representing a placement, in reverse zig-zag scan order, of the non-zero coefficients and the zero coefficients in the block of coefficients.

20. The apparatus of claim 19, wherein determining the version of the code mapping format comprises:

for decoding the first received code, determining a decoding context based on characteristics of a plurality of previously-decoded blocks of coefficients;

for decoding the second received code and the third received code, determining a decoding context based on characteristics of previously-decoded coefficients in the block of coefficients;

obtaining parameters for a total number of coefficients per block, a distribution of coefficients and a most common coefficient based on the decoding context; and generating the version of the code mapping format as a terminated infinite-tree code designed according to the parameters.

* * * * *